No. 625,172. Patented May 16, 1899.
F. LAMPLOUGH.
APPARATUS FOR MANUFACTURING MATERIAL HAVING INSULATING PROPERTIES.
(Application filed Nov. 11, 1898.)
(No Model.) 5 Sheets—Sheet 1.
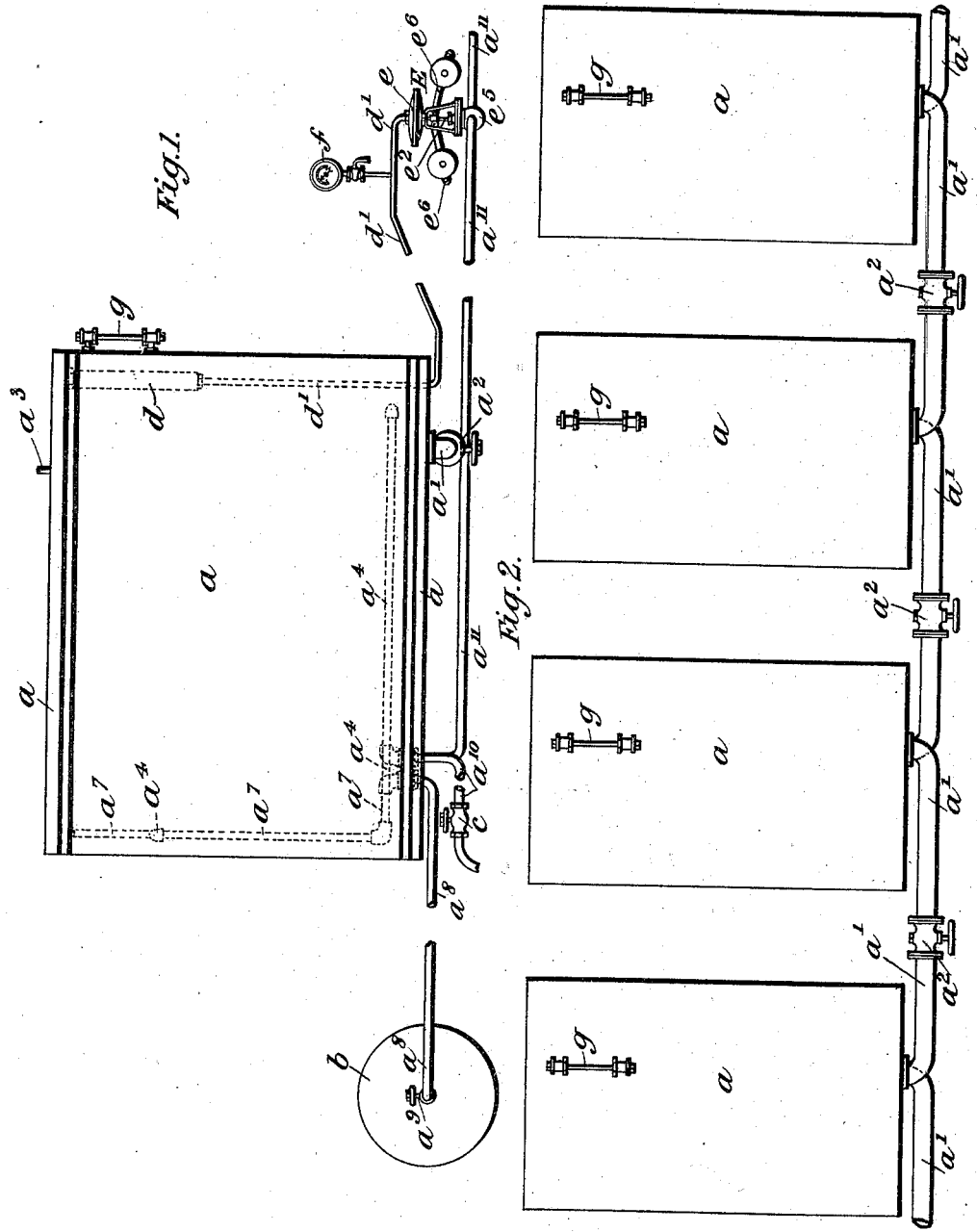
WITNESSES. INVENTOR.

No. 625,172.  
F. LAMPLOUGH.  
APPARATUS FOR MANUFACTURING MATERIAL HAVING INSULATING PROPERTIES.  
(Application filed Nov. 11, 1898.)  
(No Model.)

Patented May 16, 1899.

5 Sheets—Sheet 2.

WITNESSES.  
INVENTOR.

No. 625,172. Patented May 16, 1899.
F. LAMPLOUGH.
APPARATUS FOR MANUFACTURING MATERIAL HAVING INSULATING PROPERTIES.
(Application filed Nov. 11, 1898.)
(No Model.) 5 Sheets—Sheet 3.

WITNESSES. INVENTOR.

No. 625,172.  
F. LAMPLOUGH.  
Patented May 16, 1899.

APPARATUS FOR MANUFACTURING MATERIAL HAVING INSULATING PROPERTIES.

(Application filed Nov. 11, 1898.)

(No Model.)  
5 Sheets—Sheet 5.

WITNESSES.

INVENTOR.

UNITED STATES PATENT OFFICE.

FREDERICK LAMPLOUGH, OF LONDON, ENGLAND, ASSIGNOR TO THE VOLENITE, LIMITED, OF SAME PLACE.

APPARATUS FOR MANUFACTURING MATERIAL HAVING INSULATING PROPERTIES.

SPECIFICATION forming part of Letters Patent No. 625,172, dated May 16, 1899.

Original application filed May 31, 1898, Serial No. 682,203. Divided and this application filed November 11, 1898. Serial No. 696,170. (No model.)

*To all whom it may concern:*

Be it known that I, FREDERICK LAMPLOUGH, a subject of the Queen of Great Britain, residing at London, England, have invented a certain new and useful Improvement in Apparatus for the Manufacture of a Material Having Insulating Properties, of which the following is a specification.

The invention relates to an apparatus for treating fibrous materials for the production of material to be used for insulating and other purposes, the process employed being fully set out in an application for Letters Patent filed by me May 31, 1898, Serial No. 682,203, of which this is a division.

In carrying out the process referred to there is employed a resin, resins, or resin-oil, or both, which is conveyed into a mass of fibrous material by means of a suitable non-oxidizable oil, which will act as a vehicle and have sufficient penetrating effect to carry the resin into the material and thoroughly saturate it therewith, the complete process including other steps, among which are the driving off by a destructive distillation of the non-oxidizable oil and the oxidizing of the rest of the mass.

The apparatus is illustrated in the accompanying drawings, in which—

Figure 3:
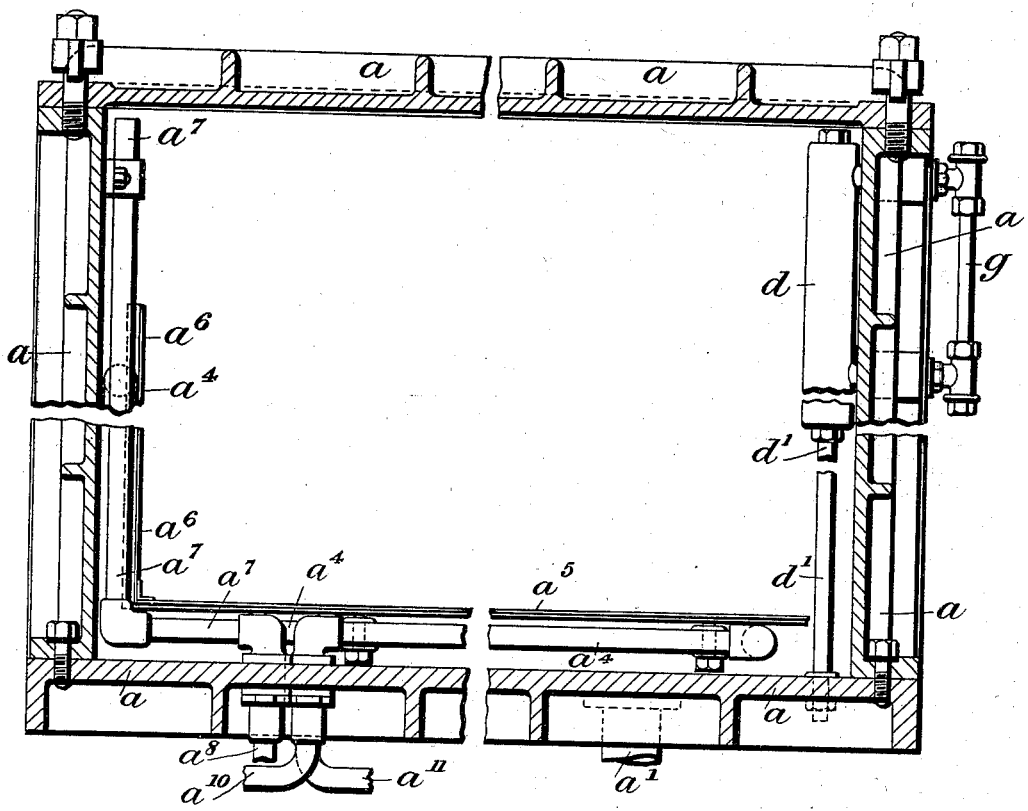
Figure 4:
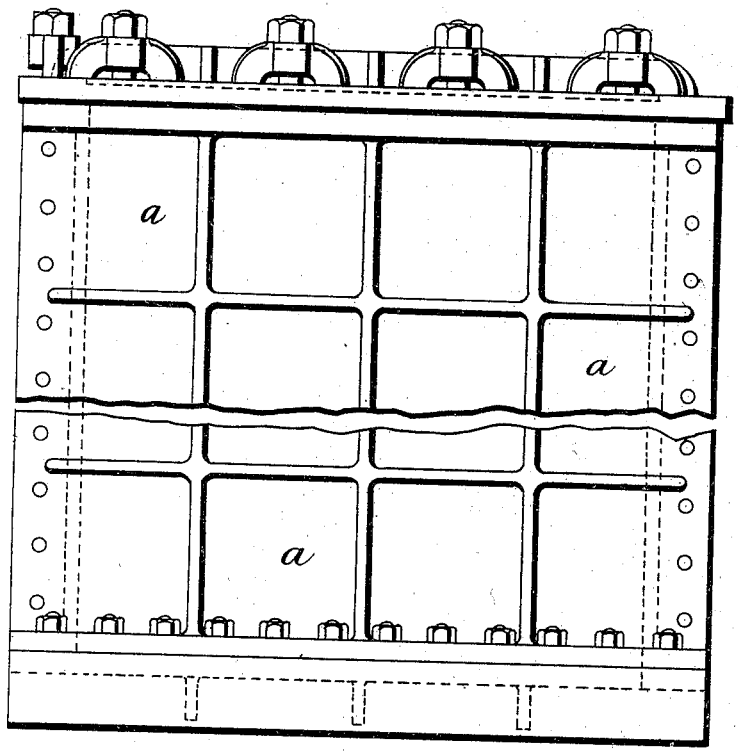
Figure 5:
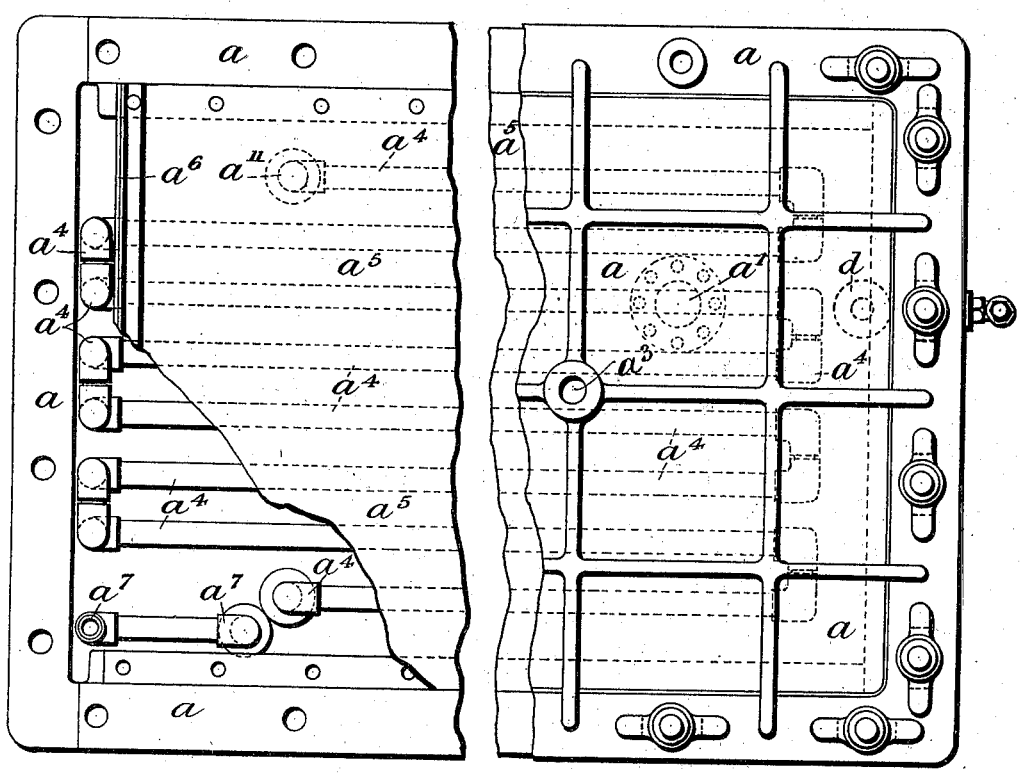
Figure 6:
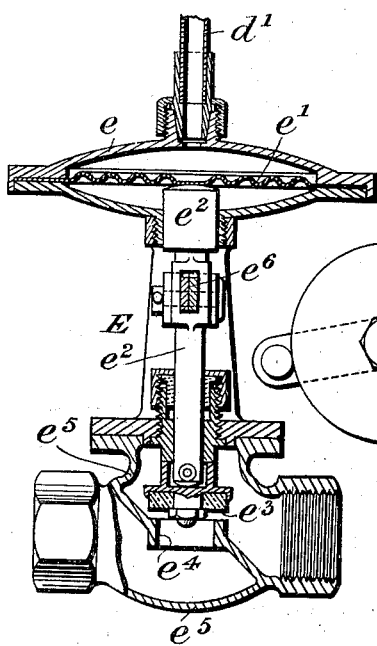
Figure 7:
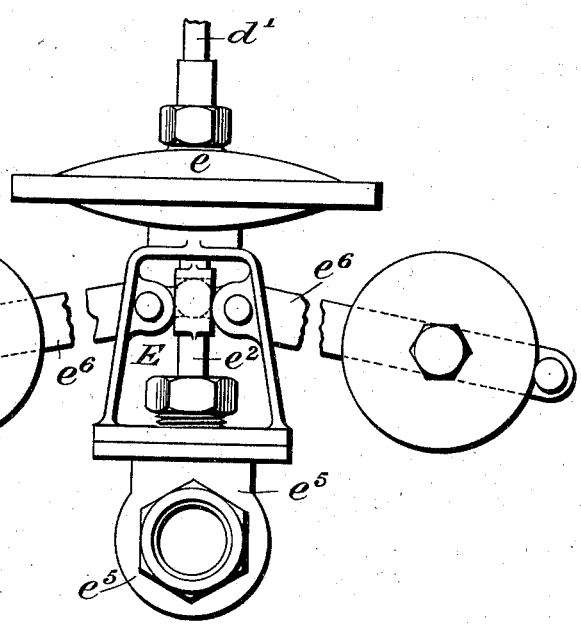

Figure 1 is a general view of the apparatus shown in side elevation. Fig. 2 is an end elevation showing an arrangement of four tanks and their connections. Fig. 3 is a vertical section, Fig. 4 an end elevation, and Fig. 5 a plan, partly in section, of one of the tanks, all these three being on an enlarged scale. Fig. 6 is a vertical section, and Fig. 7 a side elevation, of an automatic regulating device for insuring a constant temperature during the process.

The apparatus consists of two suitably-arranged sealed tanks $a$, capable of withstanding both heat and pressure. At Fig. 2 there are represented four of these tanks arranged side by side, with discharge-pipes $a'$ and valves $a^2$ so arranged that any pair of adjacent tanks can be so connected and used that either may serve as a primary tank, while the other serves as a secondary or storage tank. It may be here remarked that other numbers of tanks may be employed, and when using more than two they may be so connected that any one of them may be used as the primary tank and any other as a secondary or storage tank.

The tanks may be heated by gas-jets acting on the bottom thereof or by other means, that which is preferred consisting, as represented in the drawings, of a steam-coil $a^4$, arranged within the tank at the bottom and up one end thereof, and in order to effect a circulation of the fluid contents of the tank a circulation-plate $a^5$ is fixed over that part of the steam-coil which is at the bottom of the tank and another circulation-plate $a^6$ over that part of the steam-coil which is at the end of the tank, so that the more highly-heated fluid matters shall rise within the space between the end circulation-plate $a^6$ and the end of the tank and shall flow over the upper edge of such plate $a^6$, and thus maintain a constant circulation of such fluid matters. The tanks are also each provided with an exit-pipe $a^3$ and an air-pipe $a^7$ at one end, connected to a compressed-air reservoir $b$ by a tube $a^8$, fitted with a stop-cock $a^9$, and such reservoir $b$ is supplied with compressed air by a suitable pump. One end of the steam-coil $a^4$ is connected by a pipe $a^{10}$ to a steam-trap $c$, while the other end is connected by a pipe $a^{11}$ to a boiler. On this pipe $a^{11}$ is fixed an automatic heat-regulating device E, which is constructed and operates in the following manner: In the tank $a$ is suspended a metal tube or flask $d$, which is charged with a volatile fluid, such as alcohol, water, or the like. This flask is, by a pipe $d'$, connected to the pressure-regulating device E, which is constructed as follows: $e$ is a chamber fitted with an elastic metal diaphragm $e'$. The pressure from the tube or flask $d$ acts on one side of this diaphragm, while the latter by its other side acts on one end of a valve-rod $e^2$, on the other end of which is a valve $e^3$, acting in connection with a seat $e^4$ in the valve-body $e^5$. Thus on the desired temperature being reached in the tank the pressure generated in the tube or flask $d$, conveyed by the pipe $d'$, is caused to impinge on the diaphragm $e'$, which in turn presses on the valve $e^3$, thereby reducing the supply of steam to the coil $a^4$ and maintaining a constant temperature throughout the operation. Adjustably-weighted arms $e^6$ act on the valve-rod $e^2$ to keep it in contact with the diaphragm $e'$. If, however, gas is used as the heating medium, then the regulating device would be fixed on the gas-pipe and the supply of gas to the burners regulated to that necessary to maintain the required temperature.

A pressure-gage $f$ is fixed on the pipe $d'$ to facilitate regulation of temperature, and a gage-glass $g$ in communication with the tube or flask $d$ is fitted to each tank. The flasks are charged half-way up the gage-glass with, preferably, condensation-water.

In carrying out the process for which this apparatus is designed a material such as hemp, cotton, wood fiber, peat fiber, or other loose fiber, or it may be millboard, is employed. When the fibrous material is in the form of millboard, the sheets are placed on edge within the tank $a$, which for the time being is used as the primary tank, and preferably leaning at an angle against the sides thereof for draining the superfluous oils with which the material is to be treated previous to the said primary tank being emptied after the process. When in the form of loose fiber, the material is placed in trays or cages suspended in the tank to allow of the drainage of the oils therefrom. For the purpose of saturating the material the primary tank is charged with readily-oxidizable resins or the like, or resin-oil, or both, and a proportion of refined non-oxidizable oil, preferably a specially-refined fish-oil and powdered sulfur, if required. The temperature within the tank is now gradually raised for the purpose of expelling all air and dampness that may be in the material. The gases are driven out from the tank through the pipe $a^3$, which may terminate in any ordinary condensing apparatus. When the whole of the air and water has been extracted, the temperature within the primary tank is gradually increased, everything of a volatile nature being distilled over and passing away by the pipe $a^3$, until the material is completely saturated with the resins. After being kept at this temperature for some hours the material is ready for the next process—viz., that of oxidizing. This can be done in many ways. One which has been found to answer consists in suspending the material in a warm current of perfectly-dry air, from which it will readily extract the oxygen, which, combining with the resinous portion of the mixture held in suspension by the material, causes it to harden; but in the first instance (and as an addition to the oxidation and desiccation process above referred to) it is necessary before leaving the tank (it being too tender to handle) that a protective coat or skin should be formed. To do this, a communication between the tank which for the time being is used as the primary tank and that which is used as the secondary or storage tank is open by means of the cock or valve $a^2$ on the pipe $a'$, and on air being pumped into or compressed air being admitted to the primary tank from the reservoir $b$ the fluid contents of said primary tank are discharged into the storage-tank and the communication cock or valve $a^2$ is closed. The air is then allowed to accumulate at a pressure of a few atmospheres, being constantly changed for a few hours, by which time the material is sufficiently oxidized to be removed from the tanks. After these two oxidation steps it may be subjected to a hydraulic pressure for the purpose of increasing its density and removed to any suitable arrangement of desiccating-chamber and kept at a suitable temperature until the necessary hardness is reached, when it can be removed ready for the market.

What I claim is—

1. In an apparatus for the manufacture of insulating material, the combination of two tanks, valved connections between said tanks, means for supplying air under pressure to said tanks, a discharge-pipe for volatile substances connected to each of said tanks, means for heating each tank, means for causing the fluid contents of said tanks to circulate and means controlled by the temperature of the tanks for maintaining a constant temperature in the same, substantially as described.

2. In an apparatus of the character described, the combination of a tank, a heating-coil therein, a plate in front of said coil, a steam-supply pipe, a flask adapted to contain a volatile fluid, a connection between said flask and steam-supply pipe, a pressure-regulator in said connection, and a pipe for supplying compressed air to said tank, substantially as described.

3. In an apparatus of the character described, the combination of a closed tank; steam-coils located along the bottom and one of the sides of the tank; plates in proximity to said coils; a steam-supply pipe, a flask adapted to contain a volatile liquid in said tank, and provided with a gage-glass; a connection between said flask and pipe, a pressure-regulating device in said connection, and a pipe for supplying compressed air to said tank, substantially as described.

In testimony whereof I have hereunto set my hand in the presence of two subscribing witnesses.

FREDERICK LAMPLOUGH.

Witnesses:
WALTER J. SKERTEN,
ALBERT PARRY JONES.